(12) United States Patent
Epworth

(10) Patent No.: US 6,271,952 B1
(45) Date of Patent: Aug. 7, 2001

(54) POLARIZATION MODE DISPERSION COMPENSATION

(75) Inventor: Richard Edward Epworth, Herts (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/135,967

(22) Filed: Aug. 18, 1998

(51) Int. Cl.[7] ................................................. H04B 10/00
(52) U.S. Cl. ......................... 359/161; 359/156; 359/140
(58) Field of Search ................................. 359/161, 140, 359/156, 122, 130; 250/227.12; 385/37

(56) References Cited

U.S. PATENT DOCUMENTS 5,715,265 * 2/1998 Epworth .................................. 372/38
5,822,100 * 10/1998 Robinson et al. ..................... 359/161

OTHER PUBLICATIONS

Takahashi, J., et al., "Automatic Compensation Technique for Timewise Fluctuating Polarisation Mode Disperson in in–line Amplifier Systems," Electronics Letters, Feb. 17th, 1994, vol. 30, No. 4, pp. 348–349.

Yoshimura, et al., "Polarization Mode Disperson Equalization," Fifth Optoelectronics Conference (Dec. 1994) Technical Digest, Jul. 1994, Makuhari Messe, pp. 258–259.

* cited by examiner

Primary Examiner—Kinfe-Michael Negash
(74) Attorney, Agent, or Firm—Lee, Mann, Smith, McWilliams, Sweeney & Ohlson

(57) ABSTRACT

Polarization mode dispersion in an optical signal transmitted through a waveguide of a communications system is compensated by separating the dispersed signal into components corresponding to principal polarization states. The components are delayed by respective delays differing by a delay increment which is controlled to correspond to the dispersion delay and the delayed components are recombined to provide a dispersion compensated optical output signal. Each of the delays is provided by an chirped Bragg reflector forming part of a delay line, the Bragg reflectors comprising optical fibres with chirped intracore index gratings. Transducers or temperature controllers acting on one of the fibres allows dimensional control of the grating periodicity such that the position of Bragg reflection is variable. Wavelength division multiplexed optical signals are compensated using sampled gratings which allow a common Bragg reflection position for each wavelength.

51 Claims, 12 Drawing Sheets

OPTICAL TRANSMISSION SYSTEM WITH PMD COMPENSATOR

Fig 2 PMD COMPENSATOR

Fig 3
DIFFERENTIAL DELAY SYSTEM HAVING A DIFFERENTIAL DELAY ELEMENT FORMED BY A PAIR OF CHIRPED BRAGG GRATING FIBRES
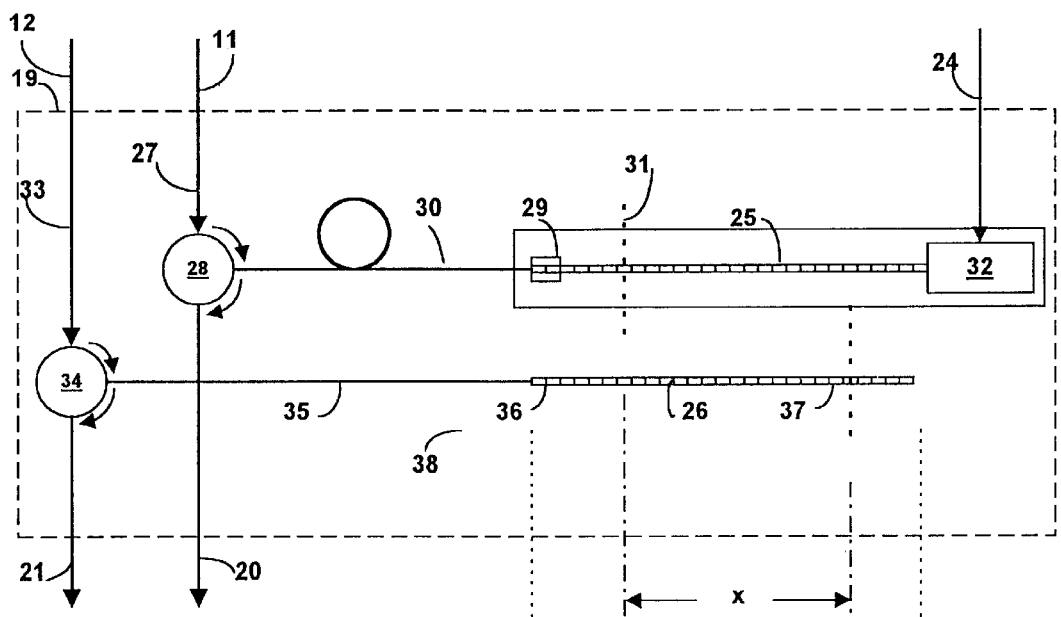
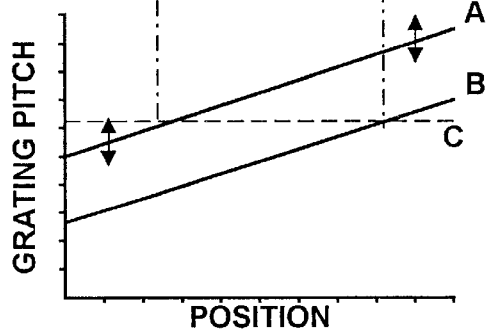
Fig 3a

PROPERTIES OF LINEAR CHIRP GRATING FIBRE WITH
UNIFORM INDEX MODULATION ENVELOPE

CHARACTERISTICS OF SAMPLED GRATING FIBRE

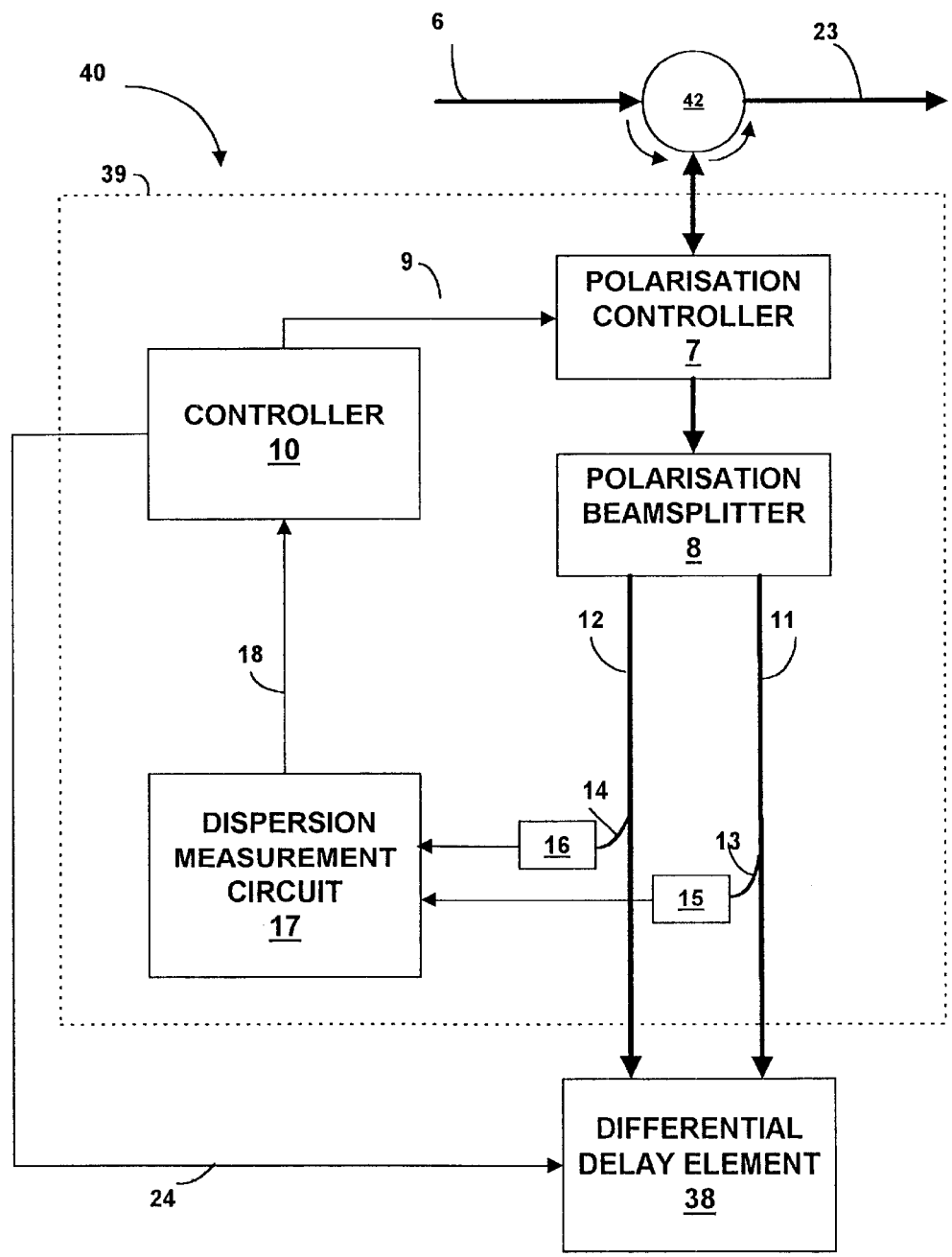
Fig 6  PMD COMPENSATOR USING A SINGLE OPTICAL CIRCULATOR

DIFFERENTIAL DELAY ELEMENT WITH A SINGLE GRATING FIBRE

DIFFERENTIAL DELAY ELEMENT WITH ELECTROMECHANICAL TRANSDUCER

DIFFERENTIAL DELAY ELEMENT WITH THERMAL TRANSDUCER

DIFFERENTIAL DELAY ELEMENT WITH FUSED FIBRES

DIFFERENTIAL DELAY ELEMENT USING POLARISATION MAINTAINING FIBRE

POLARIZATION MODE DISPERSION COMPENSATION

FIELD OF THE INVENTION

This invention relates to compensating for polarisation mode dispersion in an optical signal of an optical communications system and to an optical element for providing a variable differential delay primarily but not exclusively for use in such polarisation mode dispersion compensation.

BACKGROUND TO THE INVENTION

Existing communications systems typically rely for transmission over long distances upon the use of nominally single mode optical fibres which carry optical signals and provide transmission of signal data at 10 Gb/sec or more over distances of the order of 100 km. Although such fibres are nominally single mode, propagation of optical signals is generally characterised in such fibres by two orthogonally polarised $HE_{11}$ modes for which slightly different group velocities exist in the presence of birefringence.

For a given span of optical fibre, the difference in transmission time for these modes is termed polarisation mode dispersion.

For the given span of optical fibre, it is possible to define a pair or orthogonal principal polarisation states such that an optical pulse launched into the fibre in only one of the principal polarisation states will be received at the other end of the fibre without polarisation mode dispersion being evident, the principal polarisation states therefore representing the fast and slow axis modes of propagation. In practical systems however, it is difficult to control the launch state to always correspond to one of the principal polarisation states so that an optical signal typically comprises the sum of fast and slow mode components.

Environmental factors affecting the optical fibre produce variation over time in the birefringence effects causing polarisation mode dispersion and the resulting dispersion is observed to vary relatively slowly for fibres in buried cables and more quickly for fibres contained in overhead cables.

It is known from U.S. Pat. No. 5473457, Ono, to analyze a received optical signal in a manner which permits the principal states of polarisation to be determined and the received pulse separated into fast and slow mode components, the fast mode component then being subject to a compensating delay by means of transmission of both components through a polarisation maintaining optical fibre of predetermined length and high polarisation dispersion to provide a differential delay. This technique however has the disadvantage of making available only a fixed amount of compensation and therefore does not allow variable compensation of polarisation mode dispersion suitable for a practical communications system. A further disadvantage is that a delay element providing optical delay by transmission via a fibre will typically require a relatively long length of fibre in the range 10 to 100 meters.

It is known from WO 97/50185 to compensate for polarisation mode dispersion by splitting the received optical signal at the receiver into two polarisation states and to apply switched delays of different length to the separated components, thereby providing a variable delay. A disadvantage of this system is that the delay is not continuously and smoothly variable and also requires a relatively complex optical switching configuration.

The inventor of the present invention has previously disclosed in U.S. Pat. No. 4953939 the use of a chirped Bragg grating reflector in combination with a directional coupler to introduce a delay which is wavelength dependent because the periodicity of the Bragg grating varies with position along the fibre so that different wavelengths are reflected from different positions along the fibre. The inventor has also disclosed in U.S. Pat. No. 5602949 a technique for manufacturing a suitable chirped fibre by producing strain in a non-chirped fibre for this purpose. GB-A-2316761 discloses a method of directly writing a chirped grating into a fibre for the purpose of compensating chromatic dispersion.

There remains a need to provide an improved method of providing a continuously variable optical delay and for compensating for polarisation mode dispersion in optical fibres.

SUMMARY OF THE INVENTION

It is an object of the present invention to provide a method and apparatus of compensating for polarisation mode dispersion in a manner which adapts continuously to environmental changes affecting birefringence of the optical fibre.

It is a further object of the present invention to provide an improved optical element for providing a variable delay in an optical signal.

According to the present invention there is disclosed apparatus for compensating for polarisation mode dispersion in an optical signal transmitted via an optical waveguide of an optical communications system, the apparatus comprising;

separating means operable to separate the optical signal into first and second components having a dispersion delay therebetween;

delay means operable to delay the first and second components by respective delays differing by a delay increment;

recombining means operable to recombine the delayed first and second components to form an output signal; and control means operable to control the delay increment such that in the output signal the dispersion delay is substantially compensated by the delay increment;

wherein the delay means comprises at least one delay line having a chirped Bragg reflector extending longitudinally of the delay line, wherein said respective delay results from a time taken for said respective component to traverse the delay line to and from a reflection position at which Bragg reflection occurs, and wherein the control means is operable to variably regulate at least one parameter determining the conditions under which Bragg reflection occurs to variably define the reflection position relative to the Bragg reflector.

Preferably the parameter controlled by the control means is a characteristic of spatial periodicity as a function of position of a chirped refractive index grating formed in an optical medium of the Bragg reflector.

Conveniently the control means produces strain in the optical medium of the Bragg reflector, thereby providing a shift in the position of the Bragg reflection which is sensitive to a control signal to an actuator producing the strain.

Conveniently the Bragg reflector is formed as a refractive index grating in an optical fibre and the control means may comprise an electromechanical actuator deforming the fibre or a temperature controller allowing dimensions of the fibre to be regulated by thermal effects.

The optical fibre may comprise a sampled grating having a series of pass bands giving corresponding positions of Bragg reflection for different wavelengths of a wavelength division multiplexed optical signal.

BRIEF DESCRIPTION OF THE DRAWINGS

FIG. 3 is a schematic diagram showing a differential delay system for use in the compensator of FIG. 2 and comprising a differential delay element formed by a pair of chirped Bragg grating fibres;

FIG. 3a is a schematic graphical representation of grating pitch as a function of position for the differential delay element of FIG. 3;

FIG. 5b is a schematic graphical representation of the refractive index profile of the sampled grating fibre of FIG. 5a;

FIG. 6 is a schematic representation of an alternative polarisation mode dispersion compensator using a single optical circulator;

DETAILED DESCRIPTION OF EMBODIMENTS

Figure 1:
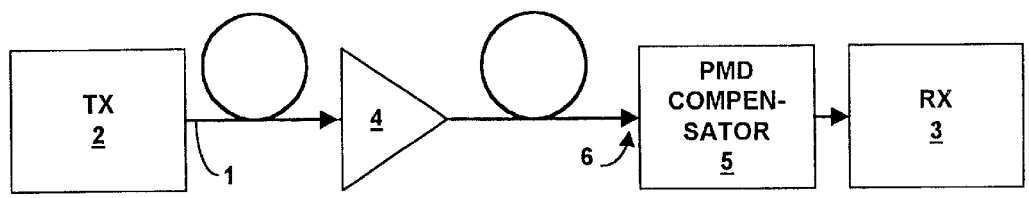
FIG. 1 is a schematic diagram of part of an optical communications system including a polarisation mode dispersion compensator.

In FIG. 1, an optical fibre 1 provides a transmission path for propagation of an optical signal from a polarised light emitting transmitter 2 to a receiver 3, this transmission path including an erbium doped optical fibre amplifier 4 and, adjacent the receiver 3, a PMD (polarisation mode dispersion) compensator 5.

The optical fibre 1 is a nominally circularly symmetric single mode fibre extending over a substantial distance, which in the present example is 100 km. Over a distance of this length the departures from perfect circular symmetry of that fibre, for example as a result of bending strain, are liable to be of a sufficient magnitude for the fibre to function as a concatenation of birefringent elements of random relative orientation. Moreover that orientation is liable to change with time.

When polarised light of any particular wavelength is transmitted through a single element exhibiting uniform birefringence, that light is, in general, resolved into two components (modes) propagating with two specific different velocities, and so possessing different transit times of propagation through that element. For each of two particular orthogonal states of polarisation (SOPs), known as the principal SOPS, the light is not resolved into different components, but propagates at a single velocity with a single transit time, i.e. propagates as a single (polarisation) mode. These principal SOPs are aligned with the principal axes of birefringence of the element. For light launched into the element with either one of these two principal SOPs, the SOP of the light remains unchanged in its passage through the element. For light launched into the element with any other SOP, that light is resolved in its passage through the element into two orthogonal components aligned with the principal axes of the element and propagating with different velocities. As a result of the velocity difference, the relative phase of the two components at the far end of the element is generally not the same as that at the launch end, and so the light emerging at the far end generally emerges with an SOP that is different from that with which it entered the element. This characteristic can be conceptualised as the SOP of the light evolving in a cyclic manner in its passage through the element.

When polarised light is transmitted through a concatenation of elements, each exhibiting uniform birefringence, but whose principal axes are not all co-aligned, then, even if that light is not resolved into two components by the first element of the concatenation, it will be so resolved by a later element. Then each of those two elements will itself be resolved into two further components by an element further along the concatenation, and so on. It can be demonstrated that for any such concatenation there exists a specific pair of orthogonal SOPs having the property that light launched with either SOP into the concatenation propagates through it with a single transit time. The transit is faster for one of the SOPs than for the other, and the difference in transit time is the polarisation mode dispersion of the concatenation. For neither one of this specific pair of orthogonal SOPs is the launch SOP maintained in the passage of the light through the concatenation, and the light emerges at the far end with an SOP that is in general different from that with which it was launched. The emergent SOP for one of the single transit time launch SOPs is orthogonal to the emergent SOP for the other single transit time launch SOP. For any launch SOP that is not one of the single transit time launch SOPs, the emergent light is composed of two components (polarisation modes), generally of unequal amplitude, which have propagated through the concatenation with different transit times, respectively the previously mentioned fast and slow single transit times of the concatenation.

By analogy with the single uniform birefringence element situation, the two single transit time launch SOPs for the concatenation are often referred to as the principle SOPs of the concatenation. Having regard to the fact that for such a concatenation the single transit time launch SOPs are, in general, different from the corresponding emergence SOPs, reference in this specification will be made to launch principal SOPs (LPSOPS) and to emergence principal SOPs (EPSOPs). From consideration of principles of reciprocity, it will be evident that the LPSOPs for one direction of propagation through the concatenation are the EPSOPs for the other, and vice versa.

Figure 2:
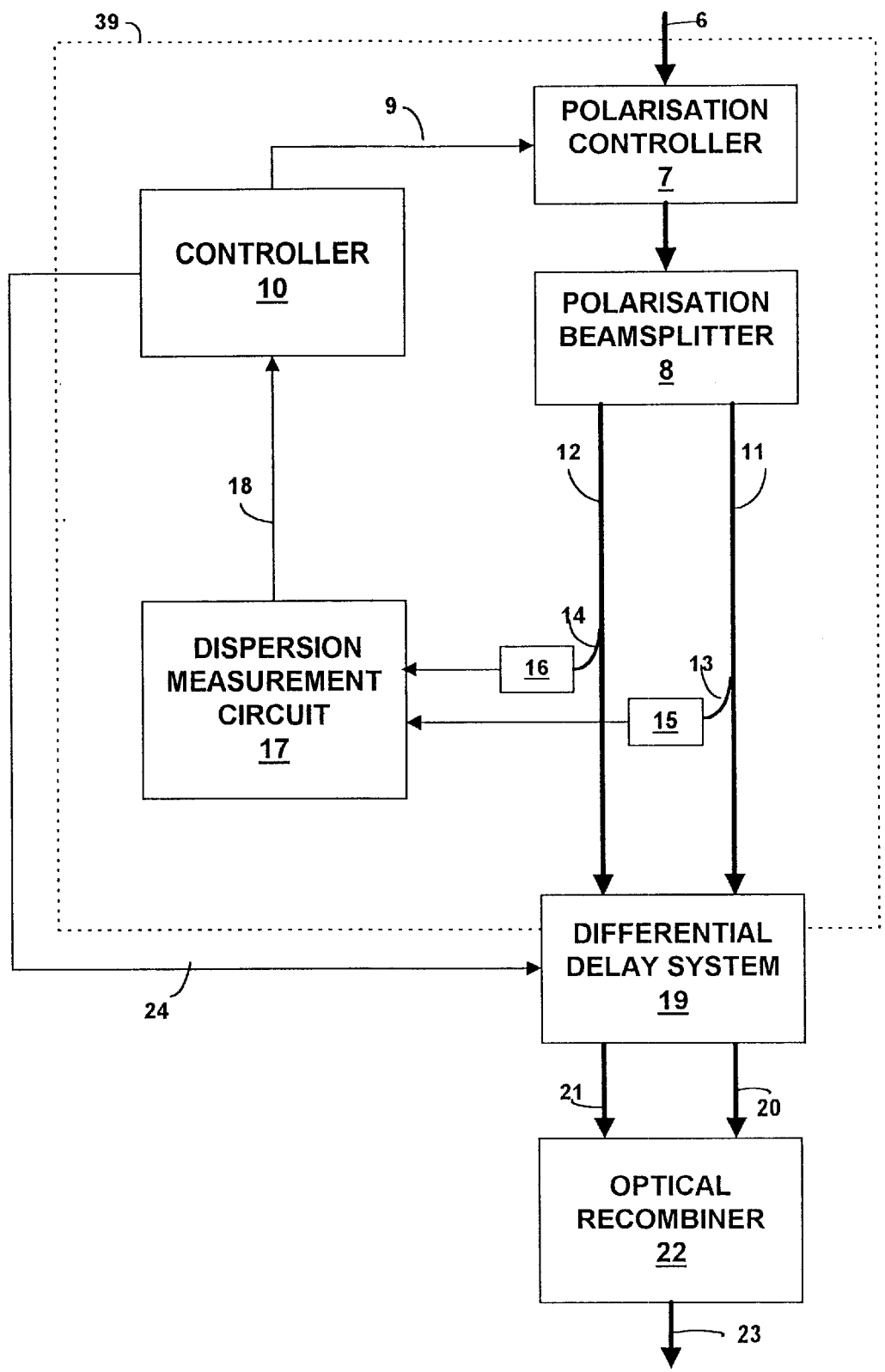
FIG. 2 is a schematic diagram showing in greater detail the polarisation mode dispersion compensator of FIG. 1 and including a differential delay system.

As shown in FIG. 2, the input 6 of the PMD compensator 5 is connected, within the compensator to a polarisation controller 7 operable to introduce a controlled amount of change of SOP from that received at input 6 so that delivered to a polarisation beam splitter 8. The amount of change of SOP induced by polarisation controller 7 is regulated by a control signal 9 from a controller 10 such that the polarisation controller maps the (time varying) EPSOPs of transmission path 1 substantially on to the principal SOPs of the polarisation beam splitter 8 so that the splitter operates to separate the polarisation modes emerging from the transmission path 1, delivering from one output of the polarisation beam splitter 8 substantially exclusively the slow mode component 11, and from the other output substantially exclusively the fast mode component 12.

Optical taps 13 and 14 are arranged to sample the slow and fast mode components 11 and 12 respectively and detectors 15 and 16 provide conversion of optical tap signals to electrical inputs of a dispersion measurement signals to electrical inputs of a dispersion measurement circuit 17. The optical signal conducted by the fibre 1 consists of a series of optical pulses at 10 Gb/sec, the dispersion measurement circuit 17 being arranged to detect a dispersion interval t between the arrival of corresponding pulses in the slow and fast mode components 11 and 12 respectively. In the context of the dispersion measurement circuit 17 therefore, the term "dispersion" is used herein to mean "differential delay".

The measurement circuit 17 outputs a signal 18 representative of the value of t to the controller 10, thereby completing a control loop enabling the polarisation controller 7 to be regulated such that the value of signal 18 is a maximum.

The slow and fast mode components 11 and 12 are input to a differential delay system 19 which introduces unequal delays differing by an amount equal to the dispersion interval t and applied in an opposite sense so as to synchronise the data pulses in the respective components.

Dispersion compensated outputs 20 and 21 from the differential delay system 19 are combined in an optical recombiner 22 to form output optical signal 23 which is directed to the receiver 3 or may alternatively be routed via a further waveguide to a remote receiver or node of the communications system.

The differential delay system 19 is responsive to a control signal 24 from the controller 10 which is dependent upon the magnitude of the dispersion interval t and effects a continuously variable differential delay T. The differential delay system 19 is therefore controlled to achieve a value of T=t.

A first example of a differential delay system 19 will now be described with reference to FIG. 3. The differential delay system 19 comprises first and second chirped Bragg grating fibres 25 and 26 which respectively constitute Bragg reflectors which introduce delays into the transmission of the slow and fast mode components 11 and 12. The slow mode component 11 is conducted by a waveguide 27 to a first optical circulator 28 which directs the incoming signal into a first end 29 of the first grating fibre 25 via a further waveguide 30. For an optical signal of a single wavelength λ, the grating fibre 25 reflects the signal at reflection position 31, at which position the grating pitch p is given by equation 1;

$$p = \frac{L\lambda}{2n} \quad (2)$$

where L (generally L=1) is the order of the grating and n is the refractive index of the grating fibre (generally approximately 1.5).

The first chirped Bragg grating 25 has a chirp characteristic A which is variable by means of a dimensional control element 32, responsive to the control signal 24 to continuously vary the overall length of the fibre 25 and to correspondingly increase or decrease the grating pitch. The variation of grating pitch with length is illustrated graphically in FIG. 3A which illustrates for the purpose of the present example a linear chirp characteristic A of fibre 25 represented as a graph of grating pitch as a function of position along the length of the fibre. The dimensional control element 32, by lengthening or shortening the fibre 25, effects an increase or decrease in the grating pitch at each position along the length of the fibre. In doing so, the reflection position 31 is movable away from or towards the first end 29 of the fibre 25 respectively, thereby increasing or decreasing the delay time taken for the optical signal to travel between the first optical circulator 28, the reflection position 31 and to return to the circulator 28. In FIG. 3a, a linear chirped characteristic B of the fibre 25 illustrates the characteristic of the fibre in the absence of any perturbation being applied by the dimensional control elements 32 and therefore also corresponds to the characteristic of the second grating fibre 26. In the graph of FIG. 3a, the characteristic A is elevated above characteristic B and therefore corresponds to an elongation of the fibre, the reflection position 31 of the first grating fibre corresponding to this elongation.

In FIG. 3a, the horizontal broken line C indicates the grating pitch at which Bragg reflection occurs in the fibres 25 and 26 for light at wavelength λ. From equation 1 it is apparent that any change in wavelength λ will correspondingly result in a change in reflection position 31, for example an increase in wavelength will move the reflection position further away from the first end 29 for a chirped grating in which the grating pitch increases with position relative to the first end.

After being returned to the circulator 28, the slow mode component 11 is routed by the circulator into a further waveguide conducting the dispersion compensated output 20.

The fast mode component 12 is conducted by a waveguide 33 to a second optical circulator 34 which diverts the fast mode component via a further waveguide 35 to the first end 36 of the second grating fibre 26. It should be noted that FIG. 3 is only schematic and that the optical paths of waveguides 30 and 35 are intended to be identical.

The fast mode component 12 is reflected at reflection position 37 in the second fibre 26 and is then returned to the second optical circulator 34 which diverts the delayed fast mode component into a further waveguide to form the dispersion compensated output 21. Because of the difference x in position of the reflection positions 31 and 37 it is apparent that the differential delay, T, between the slow and fast modes is therefore given by;

$$T = \frac{2xn}{c} \quad (3)$$

Where n is the refractive index of the fibre core and c is the speed of light.

In FIG. 3, the first and second grating fibres 25 and 26 together with the dimensional control element 32 together comprise a differential delay element 38 suitable for compensating PMD. The delay element 38 may however also have other uses in optical communication systems where a differential delay is required to be introduced between optical signals or components separated from a single optical signal.

In the PMD compensator of FIGS. 1, 2 and 3, the length of the grating fibres 25 and 26 is of the order of 1 cm and is suitable for correcting PMD occurring in a 10 Gb/sec data transmission with PMD having a maximum value of the order of 100 picosec. Approximately 1% strain is required to produce an extension of 100 microns providing the above delay. It is therefore apparent that such an arrangement has the advantage of being compact and requiring minimal physical movement to achieve the required range of delay. The delay is continuously variable and achievable with a rapid response time.

Figure 4A:
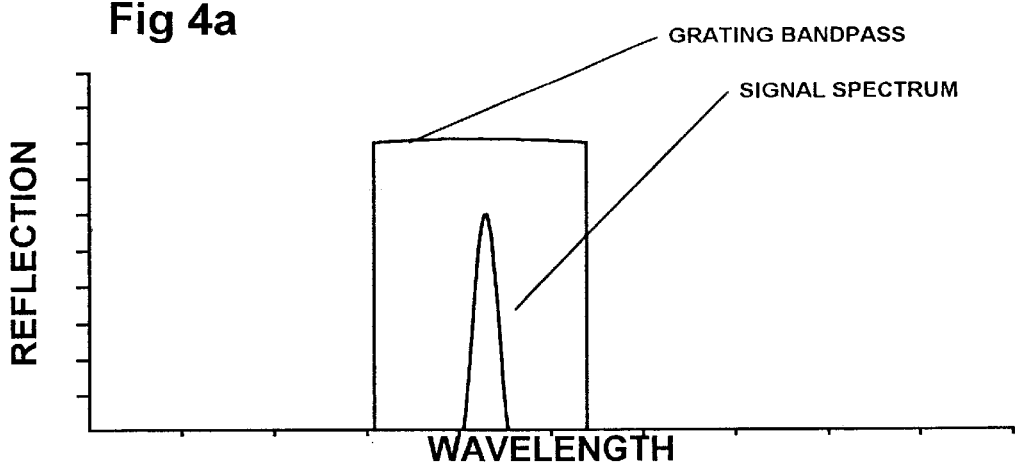
FIG. 4a is a schematic graphical representation of the spectral profile of a grating fibre.
Figure 4B:
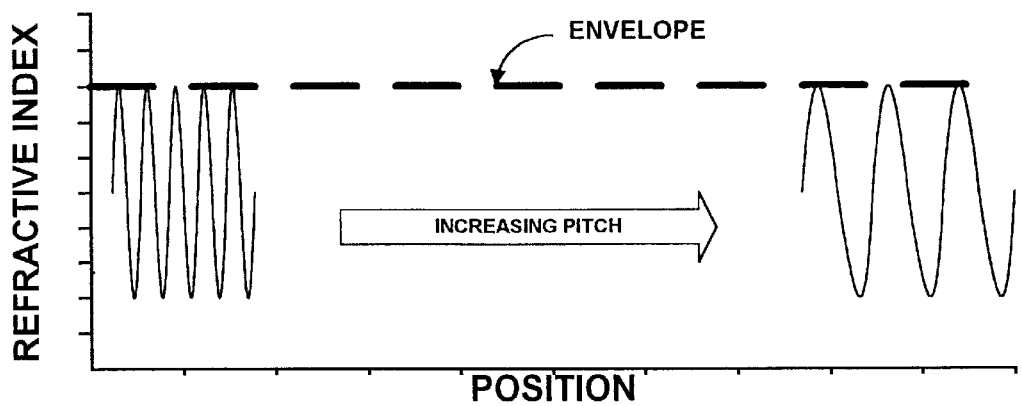
FIG. 4b is a schematic graphical representation of the refractive index modulation of a fibre grating.
Figure 4C:
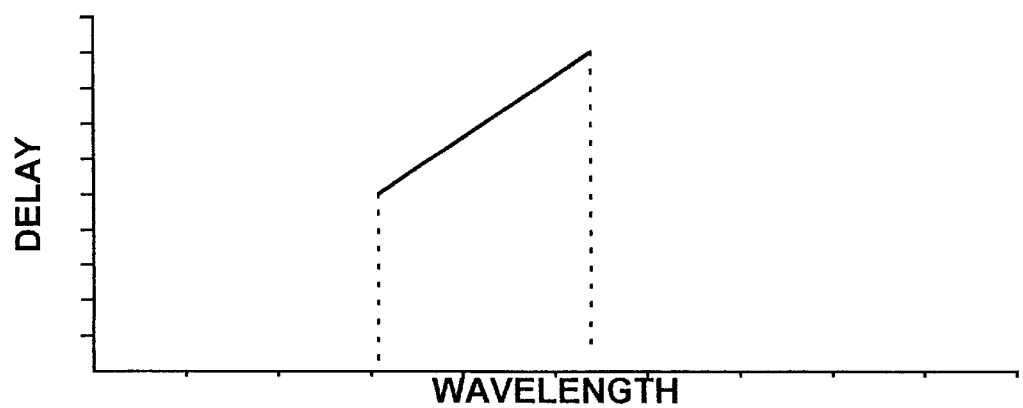
FIG. 4c is a schematic graphical representation of differential delay as a function of wavelength in a chirped fibre grating.

The optical signal will in practice have a finite bandwidth which must be taken into consideration when selecting the chirp characteristics of the grating fibres 25 and 26. Firstly, the reflection characteristics of the grating fibre have a finite bandwidth as illustrated in FIG. 4a which schematically shows a spectral profile of the reflection properties of a grating fibre with a linear chirp characteristic and for which the refractive index modulation defining the grating is uniform along the lengths of the grating as shown in FIG. 4b. The delay introduced by the grating fibre is linearly dependent on wavelengths within the pass band of the grating fibre as shown in FIG. 4c. The effect of this wavelength dependence may be utilised to provide compensation for chromatic dispersion in the optical signal. The amount of chromatic dispersion increases with the amount of chirp present in the grating fibre, i.e. with the gradient of the chirp characteristic, so that in general a degree of chromatic dispersion compensation may be selected by design choice of the magnitude and sign of the gradient of chirp characteristic of the fibre.

Figure 5A:
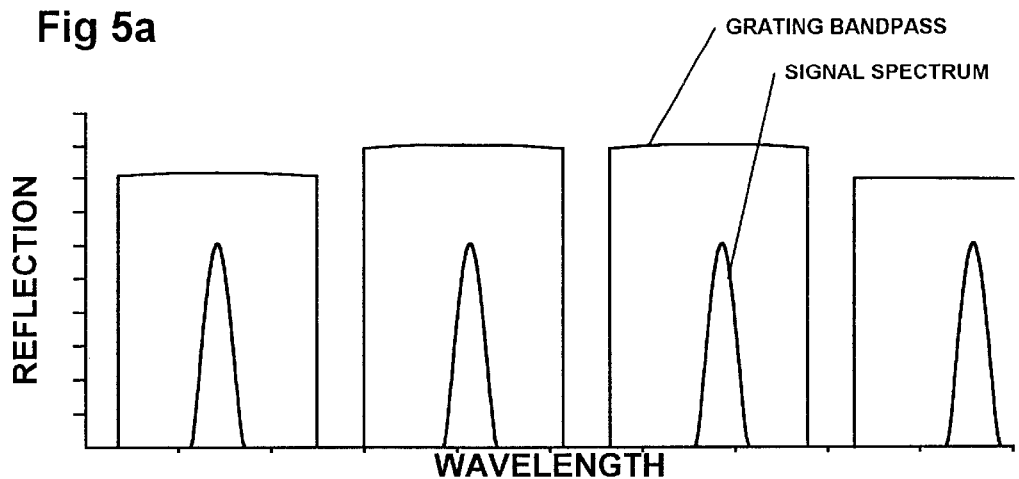
FIG. 5a is a schematic graphical representation of part of the spectral response of a sampled grating fibre.
Figure 5B:
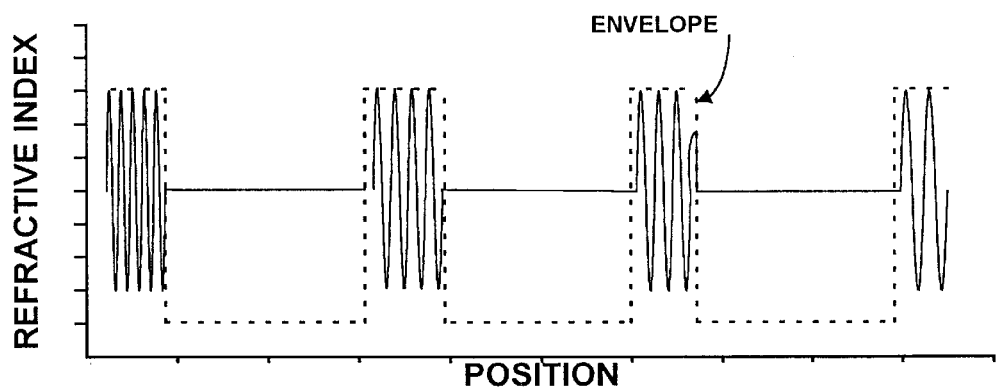
Figure 5C:
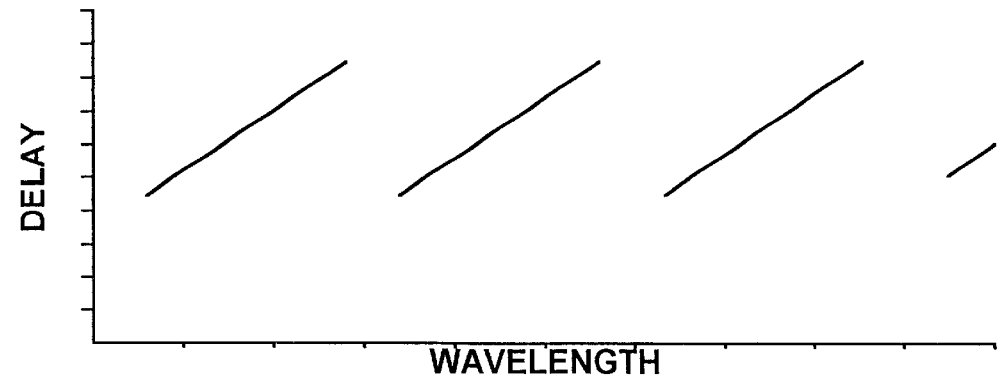
FIG. 5c is a schematic graphical representation of the delay characteristic as a function of wavelength for the sampled grating of FIGS. 5a and 5b.

When the optical signal comprises a plurality of wavelength division multiplexed signal components, it is preferable for each of the signal components to be subject to substantially the same value of differential delay T. This may be accomplished by modulating the envelope of the refractive index modulation in the fibre grating as illustrated in FIG. 5b which illustrates the refractive index n as a function of distance along the grating fibre. Whereas in FIG. 4b the refractive index is modulated approximately sinusoidally with uniform envelope, the modulation of FIG. 5b consists of periods of sinusoidal modulation of fixed level envelope separated by intervals of zero modulation in a periodic manner. Such fibre gratings are referred to as sampled gratings, or alternatively long period superstructure Bragg gratings, as described for example in Electronics Letters, Sept. 15, 1994, Vol. 30, No. 19 B. J. Eggleton et al, "Long Period Super Structure Bragg Gratings in Optical Fibres". Such sampled gratings have a frequency response characterised by a series of periodically spaced pass bands as illustrating schematically in FIG. 5a which, by appropriate modulation of the refractive index envelope in FIG. 5b are selected to coincide substantially with the wavelengths of the multiplexed components of the optical signal. As illustrated in FIG. 5c, each pass band has substantially the same delay characteristic as a function of wavelength when reflected by Bragg reflection in fibres 25 and 26 described above.

A further embodiment will now be described with reference to FIG. 6 which illustrates a PMD compensator using a single optical circulator 42. The PMD compensator 40 of FIG. 6 is connected to an optical communications system in the same manner as PMD compensator 5 in FIG. 1 and receives an input 6, an output optical signal 23 subsequently being transmitted to a receiver 3 after compensation for PMD. The PMD compensator 40 has a single optical circulator 42 which is a polarisation insensitive circulator which directs optical signals from the input 6 into a waveguide 41 which directs in turn the signal into a principal state separator 39, corresponding to the separator 39 of FIG. 2. Slow and fast mode components 11 and 12 are output from the principal state separator 39 to a differential delay element 38 which may correspond to the element 38 shown in FIG. 3 or may comprise an alternative element described hereafter.

After introducing a differential delay between the slow and fast mode components 11 and 12, these components are returned by reverse propagation via the principal state separator 39 into waveguide 41 and are directed by the circulator 42 to form the output optical signal 23 which has been PMD compensated.

An advantage of the arrangement of FIG. 6 is that only a single circulator 42 is required and the provision of a separate optical recombiner 22 of FIG. 2 is no longer required since optical recombination is effected by means of the polarisation beam splitter 8, acting as a Y coupler for the returning components 11 and 12.

The embodiment of FIG. 6 may be configured to provide compensation in the case of single wavelength optical signals as discussed above with reference to FIG. 4 or wavelength division multiplexed signals as referred to above with reference to FIG. 5.

An alternative differential delay element will now be described with reference to FIG. 7 using corresponding reference numerals to those of preceding figures where appropriate. The differential delay element 45 of FIG. 7 comprises a single chirped Bragg grating fibre 25 with a dimensional control element 32 regulated by a control signal 24 in the manner described above with reference to FIG. 3. A slow mode component 11 is input to the grating fibre 25 and is subject to Bragg reflection with a variable delay dependent upon the value of signal 24.

A fast mode component 12 is input to a waveguide 46 terminated in a simple reflector represented schematically by mirror 47. The waveguide 46 thereby provides a constant delay and the grating fibre 25 provides a variable delay so that the difference in delay between modes 11 and 12 is variable. This arrangement is clearly simpler in construction than the arrangement of FIG. 3 and would be suitable in systems where chromatic dispersion compensation was not required. The delay element 38 of FIG. 3 however would be preferable if a relatively large amount of chromatic dispersion compensation was required since equal amounts of chromatic dispersion compensation are available to both slow and fast mode components 11 and 12.

In the differential delay elements 38 and 45 referred to above, reference has been made to a dimensional control element 32. Practical implementations of such dimensional control element will now be disclosed.

Figure 8:
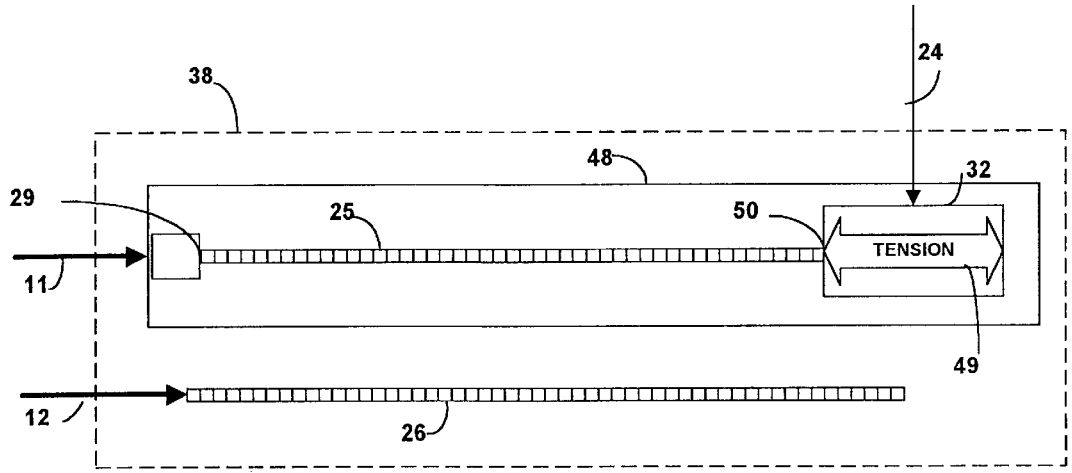
FIG. 8 is a schematic representation of a differential delay element having an electro-mechanical transducer.

FIG. 8 illustrates a first example in which the first grating fibre 25 is clamped at its first end 29 relative to a support 48. The dimensional control element 32 consists of an electrically powered actuator 49 operable to apply tension to the fibre 25 by displacement of a second end 50 of the fibre relative to the support 48.

Figure 9:
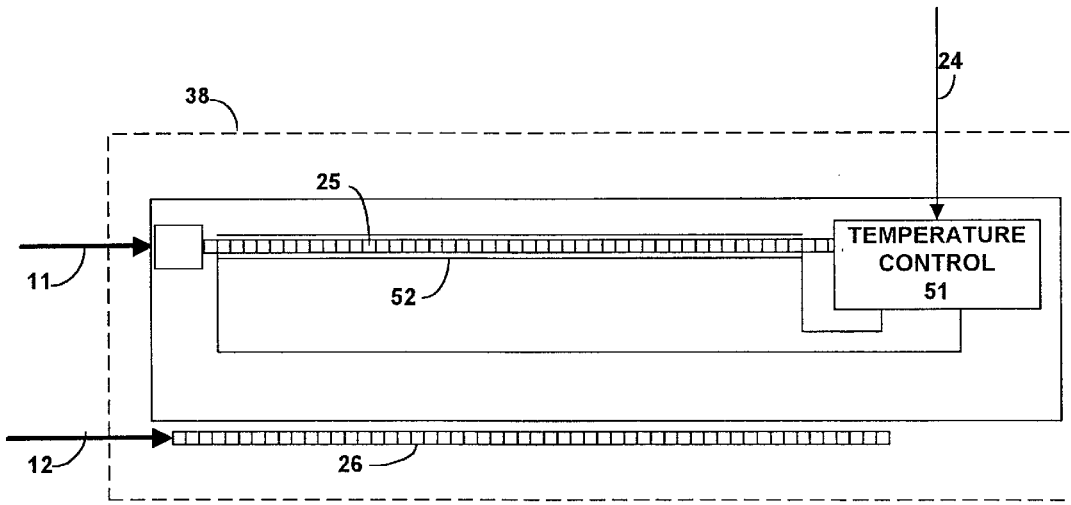
FIG. 9 is a schematic representation of a further differential delay element having a thermal transducer.

FIG. 9 illustrates an alternative dimensional control element 32 in which fibre 25 is maintained at a variably controllable temperature by means of a temperature control circuit 51 connected to a thermal actuator 52. The thermal actuator 52 may simply be a resistive coating applied to the fibre.

In each of the differential delay elements of FIGS. 8 and 9, a second grating fibre 26 remains uninfluenced by the dimensional control element 32, thereby providing the reference against which the variable delay induced in the first fibre 25 creates a differential delay.

Figure 10:
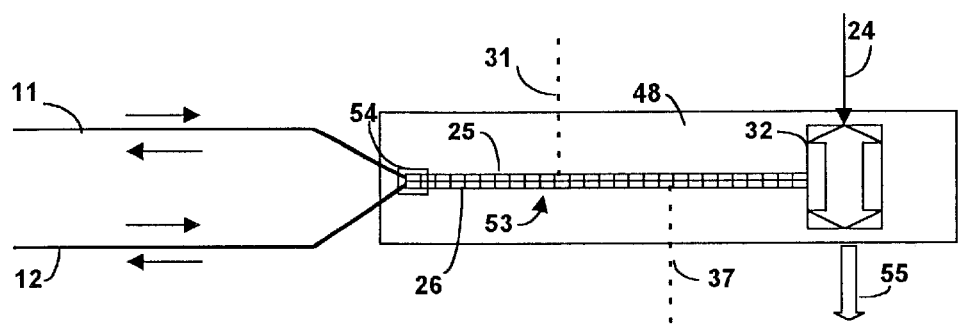
FIG. 10 is a schematic representation of a further differential delay element having fused fibres.

FIG. 10 shows an alternative arrangement in which the first and second grating fibres 25 and 26 are fused together in side by side configuration so as to co-extend along a support 48 to which the resulting fused fibre assembly 53 is clamped at a first end 54.

Figure 10A:
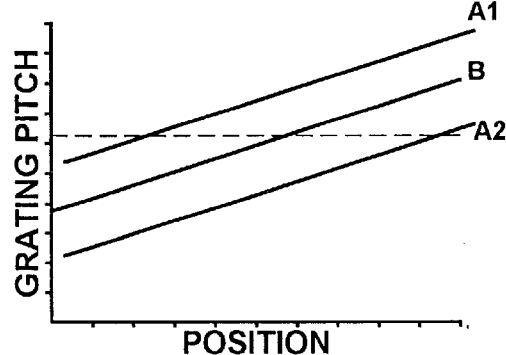
FIG. 10a is a schematic graphical representation illustrating the variation of pitch with position for the fibre of FIG. 10.

A dimensional control element 32 is arranged to apply a bending moment to the fused fibre assembly 53 relative to the support 48 to effect bending in a plane common to the respective axes of the fibres 25 and 26. In FIG. 10, bending in the direction of arrow 55 for example will result in longitudinal extension of the first fibre 25 and longitudinal compression of the second fibre 26, thereby increasing the pitch of the grating in first fibre 25 and decreasing the pitch in fibre 26 at each position along the length of the respective fibres. This is illustrated graphically in FIG. 10a in which curve B is the chirp characteristic for the unstrained fibres 25 and 26 and curves A1 and A2 are the chirped characteristics when strained in direction 55.

The dimensional control element 32 in FIG. 10 may be any suitable electrically operable actuator such as a solenoid or piezoelectric device controlled by the control signal 24.

A further alternative differential delay element 56 will now be described with reference to FIG. 11 using corresponding references to those of previous figures where appropriate for corresponding elements.

Figure 11:
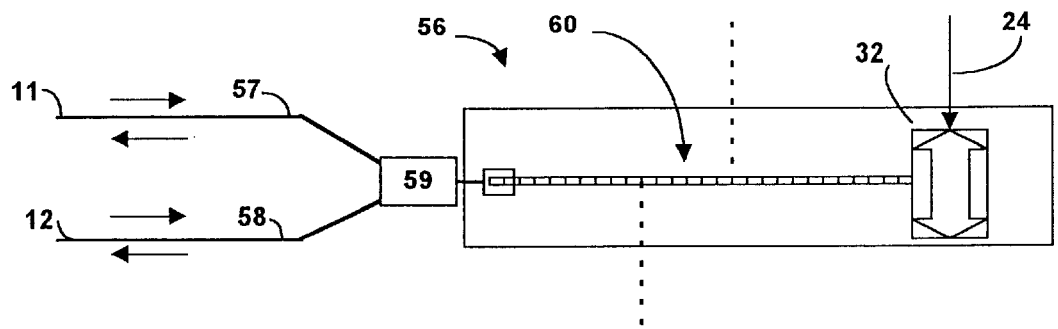
FIG. 11 is a schematic representation of a further alternative differential delay element having a polarisation maintaining fibre.
Figure 11A:
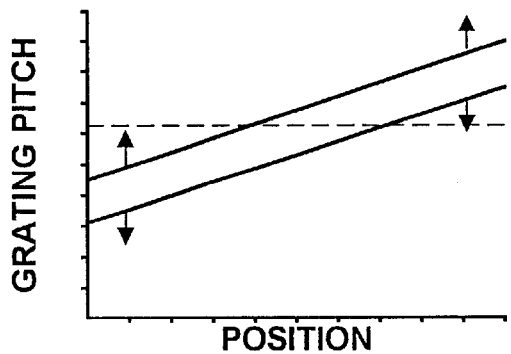
FIG. 11a is a schematic graphical representation of the grating pitch as a function of position for the separate modes conducted via the fibre of FIG. 11.
Figure 11B:
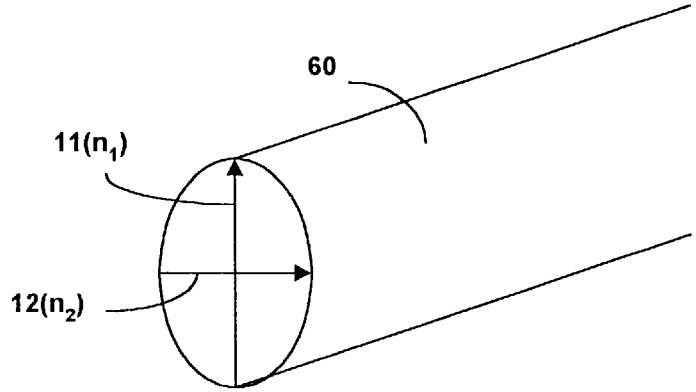
FIG. 11b is a schematic representation of the fibre of FIG. 11.

In the differential delay element 56 of FIG. 11, wave guides 57 and 58 conducting the slow and fast mode components 11 and 12 are coupled by means of a coupler 59 into a single polarisation maintaining fibre 60 such that the slow and fast mode components 11 and 12 are separately and orthogonally propagated as illustrated schematically in FIG. 11b. A dimensional control element 32 is arranged to apply a bending moment in the same manner described above with reference to the fused fibre assembly 53 of FIG. 10. The polarisation maintaining fibres 60 is selected to be highly birefringent with respect to the orthogonal modes, thereby presenting different refractive indices $n_1$ and $n_2$ which, by equation 1, results in reflection occurring for a given wavelength at values of grating pitch $p_1$ and $P_2$ where;

$$p_1 = \frac{L\lambda}{2n_1} \text{ and } p_2 = \frac{L\lambda}{2n_2} \quad (4)$$

Applying a bending moment differentially changes $n_1$ and $n_2$ thereby shifting the axial positions along the grating fibre 60 at which reflection occurs for the slow and fast mode components 11 and 12.

FIG. 11a shows graphically the effect on the respective characteristics caused by bending, movement of the respective characteristic curves being indicated by arrows.

Figure 12:
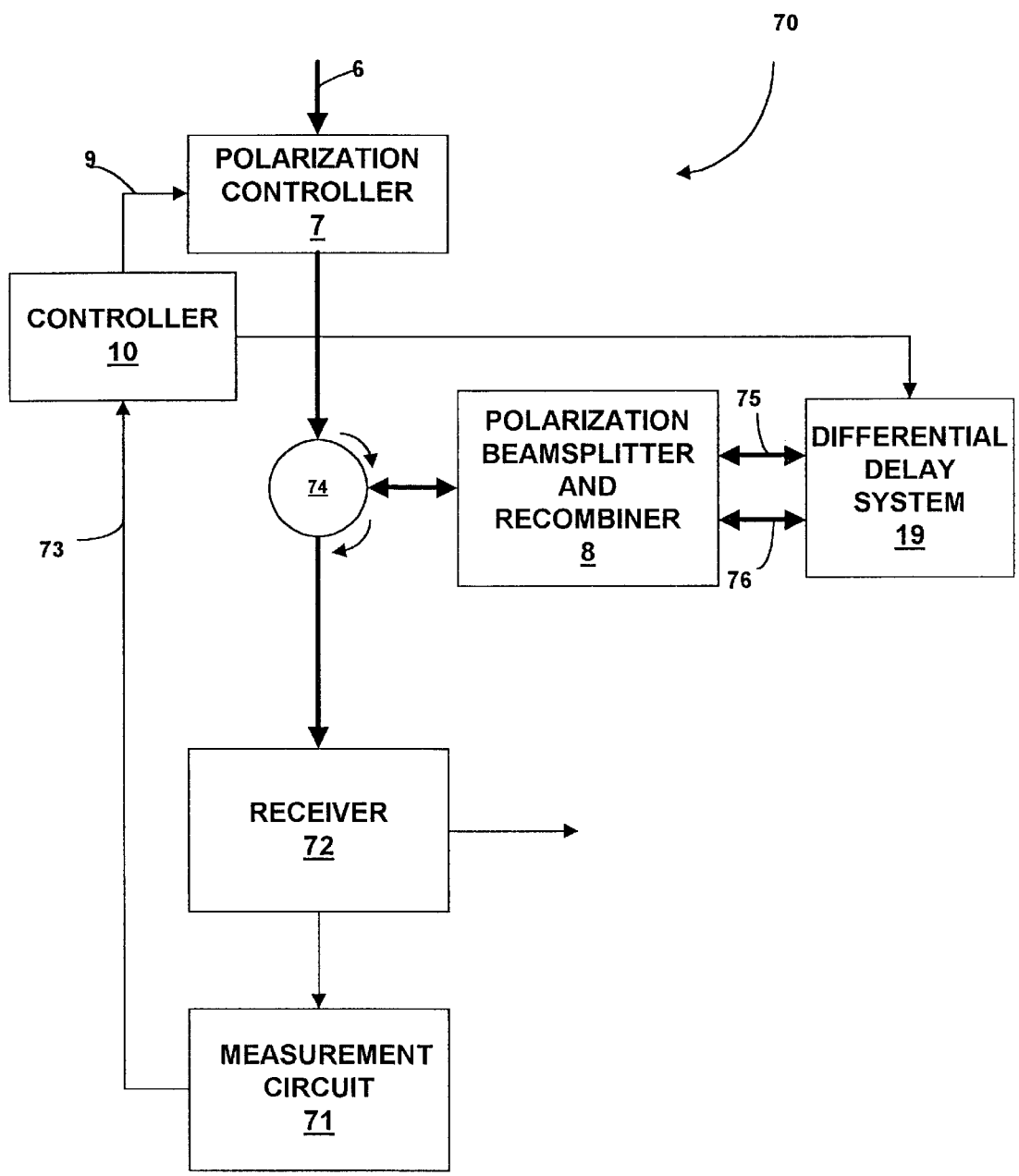
FIG. 12 is a schematic representation of an alternative embodiment of the polarization mode dispersion compensator of FIG. 1.

FIG. 12 illustrates schematically an alternative polarization mode dispersion compensator 70 which may be used as compensator 5 in the system of FIG. 1.

The compensator 70 will be described using corresponding reference numerals to preceding figures where appropriate for corresponding elements. The compensator 70 differs from the compensator of FIG. 2 in that the dispersion measurement circuit 17 of FIG. 2 measuring the input to the differential delay system 19 is replaced by a measurement circuit 71 which measures the output of a receiver 72 whose optical input has been subjected to compensation by differential delay system 19. The measurement circuit 71 provides a feedback signal 73 to the controller 10 which controls both the polarisation controller 7 and the differential delay system 19.

The compensator 70 of FIG. 12 has therefore essentially a feedback configuration whereas the compensator of FIG. 2 has essentially a feed forward configuration. It will be apparent that, when the output of the compensator of FIG. 2 is connected to a receiver, the arrangement of FIG. 2 requires two detection stages, i.e. detection in the receiver and detection by the detectors 15 and 16. The arrangement of FIG. 12 however includes a single detection stage, i.e. detection in the receiver 72.

The PMD compensator 70 of FIG. 12 has an input waveguide 6 connected to a polarization controller 7 operable to introduce a controlled amount of change of polarization state of the optical signal as received. The output of the polarization controller is diverted by an optical circulator 74 into a polarization beam splitter and recombiner 8 connected to output waveguides 75 and 76 such that the optical signal is divided into a slow mode component output in waveguide 75 and a fast mode component output in waveguide 76, these components having polarization states corresponding substantially to the instantaneous emergence principal polarization states.

After applying a differential delay by operation of the differential system 19 under the control of controller 10, the components are returned to the recombiner 8 and the recombined output returned to the circulator 74. The returned compensated output is directed to the receiver 72 by the circulator 74 where the compensated output optical signal is detected.

The measurement circuit 71 derives from the electronic output of the receiver 72 a measure of the amount of signal degradation associated with polarization mode dispersion and any one of a number of techniques may be used. For example, the measurement circuit 71 may comprise an eye monitor responsive to the electrical signal output of the receiver 72 to obtain a measure of signal eye opening. Since the signal eye closes in the presence of dispersion, the eye monitor output provides an appropriate feedback signal 73 for control, the term dispersion here being used in the sense of pulse spreading.

Figure 13:
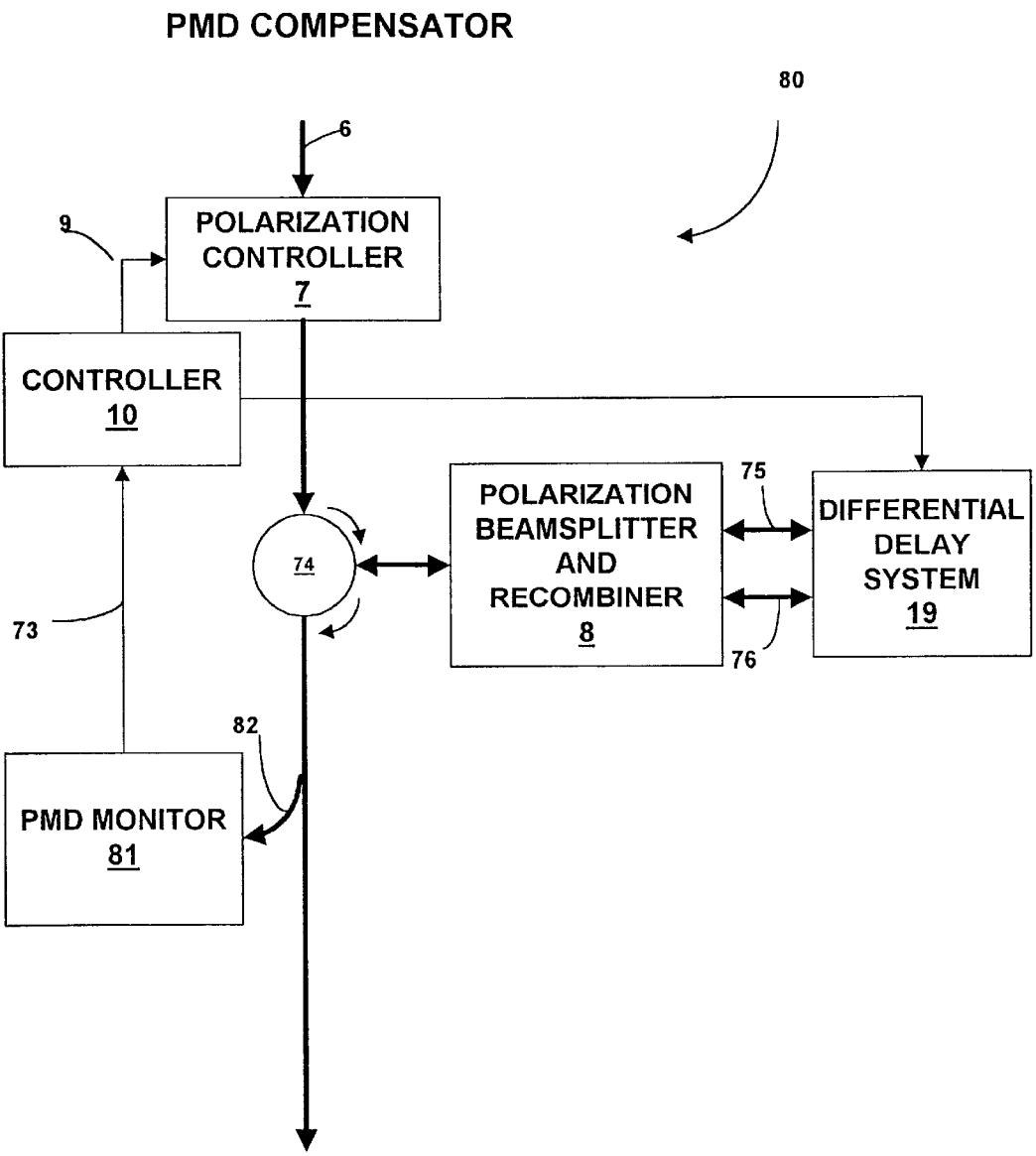
FIG. 13 shows a further alternative embodiment.

FIG. 13 shows a further alternative PMD compensator 80 in which reference numerals corresponding to those of preceding figures are used where appropriate for corresponding elements. In the compensator 80, a polarization mode dispersion monitor 81 receives an optical tap signal 82 and measures the amount of polarization mode dispersion to obtain the required feedback signal 73. The PMD monitor may be of any one of a number of types and may for example comprise a monitor as disclosed in co-pending application US08/795684 filed Feb. 5, 1997.

The optical output following differential delay and recombination may be input to a receiver (not shown) or may alternatively form an output signal for onward transmission in the optical communication system of FIG. 1. The compensator 80 of FIG. 13 is therefore particularly suited to providing PMD compensation at a node of a network at which no receiver is located.

Any one of the differential delay elements of FIGS. 7, 8, 9, 10 and 11 may be used in a PMD compensator such as described above with reference to FIG. 2, 6, 12 or 13, using either a sampled or non-sampled chirped Bragg grating fibre according to whether wavelength multiplexed division transmission is required.

In each case the chirped characteristic may be selected to provide a controlled amount of chromatic dispersion compensation if required.

Figure 7:
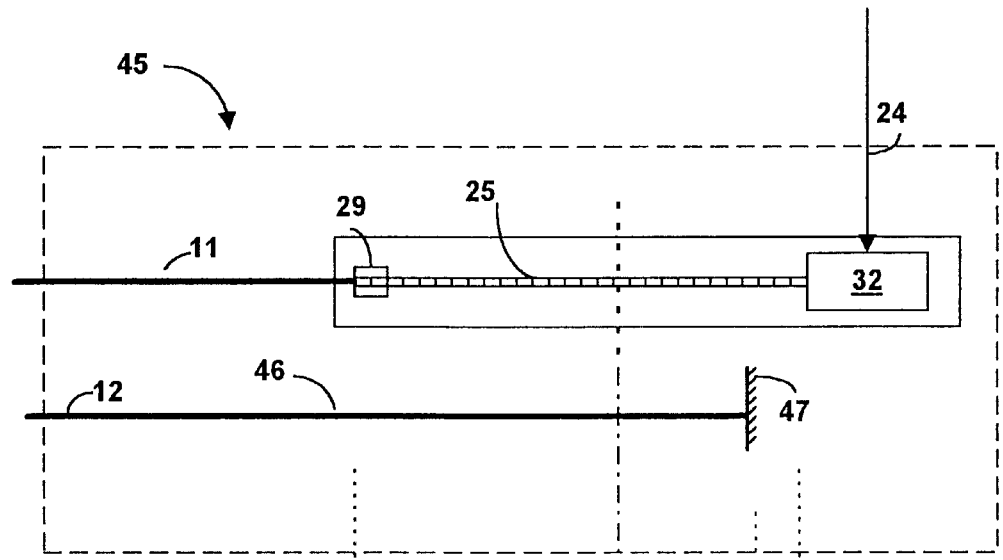
FIG. 7 is a schematic representation of a differential delay element with a single grating fibre.
Figure 7A:
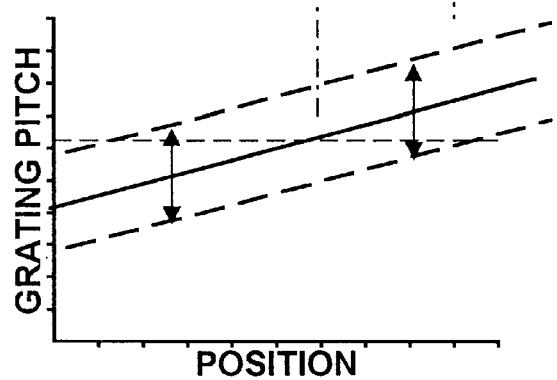
FIG. 7a is a schematic graphical representation of the variation of grating pitch with position for the element of FIG. 7.

With the exception of the embodiment of FIG. 7, each of the above differential delay elements includes reflection of the slow and fast mode components 11 and 12 by Bragg reflection in a correspondingly chirped grating, thereby providing an inherent insensitivity to any fluctuation in wavelength of the optical signal since both fast and slow mode components will be subject to equivalent changes in delay due to wavelength fluctuation. In the case of the FIG. 7 embodiment, one of the components is reflected by a simple reflector so that the point of reflection in the Bragg grating fibre 25 is sensitive to changes in wavelength in accordance with equation 1. As an alternative embodiment therefore, a differential delay element as shown in FIG. 7 may be utilised without actuation of dimensional control element 32 simply by controlled variation of the transmitted wavelength of the optical signal, the wavelength being controlled by a feedback signal such that the position at which Bragg reflection occurs provides a differential delay equal and opposite to the amount of polarisation mode dispersion measured in measurement circuit 17. The feedback signal may conveniently be transmitted optically in the fibre 1 in a direction opposite to that of the optical signal transmission.

The electromagnetic solenoid actuator 49 referred to above may alternatively be replaced by a piezoelectric actuator. The thermal actuator 52 referred to above may alternatively comprise Peltier heating/cooling elements arranged to raise or lower the temperature of the fibre in a controlled manner in response to the signal 24.

In the above described embodiments, the formation of the Bragg grating may alternatively be effected in a waveguide other than an optical fibre.

The above described embodiments refer to a linear chirp characteristic in the Bragg grating. Non-linear chirp characteristics may alternatively be utilised.

The embodiments described with reference to FIG. 3, 8 and 9 may alternatively include an additional dimensional control element operable on the second chirped Bragg grating fibre, the control actuation being preferably in an opposite sense to control of the first fibre.

Other variations falling within the scope of the appended claims will be apparent to those skilled in the art in the light of the above disclosure.

What is claimed is:

1. Apparatus for compensating for polarisation mode dispersion in an optical signal transmitted via an optical waveguide of an optical communications system, the apparatus comprising;

separating means operable to separate the optical signal into first and second components having a dispersion delay therebetween;

delay means operable to delay the first and second components by respective delays differing by a delay increment;

recombining means operable to recombine the delayed first and second components to form an output signal; and control means operable to control the delay increment such that in the output signal the dispersion delay is substantially compensated by the delay increment;

wherein the delay means comprises at least one delay line having a chirped Bragg reflector extending longitudinally of the delay line, wherein said respective delay results from a time taken for said respective component to traverse the delay line to and from a reflection position at which Bragg reflection occurs, and wherein the control means is operable to variably regulate at least one parameter determining the conditions under which Bragg reflection occurs to variably define the reflection position relative to the Bragg reflector.

2. Apparatus as claimed in claim 1, wherein the parameter controlled by the control means is a characteristic of spatial periodicity as a function of position of a chirped refractive index grating formed in an optical medium of the Bragg reflector.

3. Apparatus as claimed in claim 2, wherein the control means comprises strain producing means operable to produce a variable strain in the optical medium of the Bragg reflector.

4. Apparatus as claimed in claim 3, wherein the Bragg reflector comprises an optical fibre and wherein said refractive index grating is defined in a core of the fibre constituting said optical medium.

5. Apparatus as claimed in claim 4, wherein the strain producing means comprises an actuator operable to apply variable tension to the fibre in the direction of its longitudinal extent.

6. Apparatus as claimed in claim 4, wherein the control means comprises an actuator operable to apply a variable bending moment to the fibre.

7. Apparatus as claimed in claim 2, wherein the control means comprises temperature control means operable to vary the characteristic of spatial periodicity as a function of position by thermal expansion and contraction of the optical medium.

8. Apparatus as claimed in claim 7, wherein the Bragg reflector comprises an optical fibre defining the refractive index grating and wherein the temperature control means comprises an electrically conductive surface layer of the fibre and a heater control circuit operable to maintain the fibre at a controlled temperature.

9. Apparatus as claimed in claim 2, wherein said delay means comprises first and second delay lines having respective first and second Bragg reflectors.

10. Apparatus as claimed in claim 9, wherein said first and second Bragg reflectors are constituted by respective first and second optical fibres having respective intra-core refractive index gratings.

11. Apparatus as claimed in claim 10, wherein said first and second fibres are fused together in side by side relationship and wherein said control means comprises an actuator operable to effect bending of the fused fibres such that respective periodicities of the index gratings are varied by different amounts.

12. Apparatus as claimed in claim 9, wherein said first and second Bragg reflectors define respective spatial periodicities of refractive index gratings which vary with position according to respective chirp characteristics which at least partially compensate for chromatic dispersion in the first and second components respectively.

13. Apparatus as claimed in claim 3, wherein the optical medium is constituted by a polarisation maintaining optical fibre having an intracore refractive index grating, the delay means comprising means for directing the first and second components into the polarisation maintaining fibre so as to propagate in orthogonal first and second modes.

14. Apparatus as claimed in claim 13, wherein said strain producing means comprises an actuator operable to effect bending of the fibre in a direction which varies the amount of birefringence between the first and second modes.

15. Apparatus as claimed in claim 1, wherein the separating means is operable to separate the first and second components so as to correspond substantially to principal polarisation states of the optical signal with respect to the optical waveguide in which said polarisation mode dispersion occurs.

16. Apparatus as claimed in claim 15, wherein the separating means comprises a polarisation controller receiving the optical signal, and a polarisation beam splitter receiving the output of the polarisation controller and outputting the first and second components.

17. Apparatus as claimed in claim 16 comprising, a dispersion measurement circuit operable to measure the dispersion delay between the first and second components, and a controller responsive to the measurement of dispersion delay and operable to control the polarisation controller such that the dispersion delay measurement is maximised.

18. Apparatus as claimed in claim 17, wherein the first and second components output from the polarisation beam splitter are input to respective directional couplers operable to direct the respective components into first and second delay lines, the directional couplers being further operable to direct the delayed components to the recombining means.

19. Apparatus as claimed in claim 17, wherein the input signal is directed to the polarisation controller via a directional coupler and wherein the first and second components output from the polarisation beam splitter are input to said respective delay lines, the delayed first and second components being returned via the polarisation beam splitter and polarisation controller to the directional coupler which is further operable to direct the delayed components to an output waveguide, whereby said recombining means is constituted by said polarisation beam splitter.

20. Apparatus as claimed in claim 16 comprising mesurement means responsive to the output signal form the recombining means to provide a feedback signal representative of the effect of polarization mode dispersion in the output signal, and a controller responsive to the feedback signal to control the polarization controller and the delay means so as to minimize the measured effect of polarization mode dispersion.

21. Apparatus as claimed in claim 20 wherein the measurement means comprises a receiver operable to provide an electrical output representative of the output signal from the recombining means and a measurement circuit responsive to the electrical output to provide said feedback signal.

22. Apparatus as claimed in claim 2, wherein the spatial periodicity is a linear function of longitudinal position relative to the optical medium.

23. Apparatus as claimed in claim 2, wherein the refractive index grating comprises a chirped periodic modulation of refractive index as a function of position along the optical medium and wherein the modulation has an amplitude envelope which is modulated with respect to position such that the grating constitutes a sampled grating, whereby reflection at a common reflection position occurs for a plurality of wavelength components of the optical signal.

24. Apparatus as claimed in claim 1 wherein the parameter controlled by the control means is constituted by the values of one or more wavelengths of the optical signal, said control means comprising means for varying the values of one or more wavelengths of the optical signal transmitting via a waveguide in which the polarisation mode dispersion occurs.

25. A method of compensating for polarisation mode dispersion in an optical signal transmitted via an optical waveguide of an optical communications system, the method comprising the steps of;

separating the optical signal into first and second components having a dispersion delay therebetween;

delaying the first and second components by respective delays differing by a delay increment;

recombining the delayed first and second components to form an output signal; and controlling the delay increment such that in the output signal the dispersion delay is substantially compensated by the delay increment;

wherein the delaying step comprises delaying at least one component by transmission via a delay line having a chirped Bragg reflector extending longitudinally of the delay line, wherein said respective delay results from a time taken for said respective component to traverse the delay line to and from a reflection position at which Bragg reflection occurs, and wherein the controlling step variably regulates at least one parameter determining the conditions under which Bragg reflection occurs to variably define the reflection position relative to the Bragg reflector.

26. A method as claimed in claim 25, wherein the parameter controlled by the controlling step is a characteristic of spatial periodicity as a function of position of a chirped refractive index grating formed in an optical medium of the Bragg reflector.

27. A method as claimed in claim 26, wherein the controlling step comprises producing a variable strain in the optical medium of the Bragg reflector.

28. A method as claimed in claim 27, wherein the Bragg reflector comprises an optical fibre and wherein said refractive index grating is defined in a core of the fibre constituting said optical medium.

29. A method as claimed in claim 28, wherein the strain is produced by an actuator applying variable tension to the fibre in the direction of its longitudinal extent.

30. A method as claimed in claim 28, wherein the controlling step comprises operating an actuator to apply a variable bending moment to the fibre.

31. A method as claimed in claim 26, wherein the controlling step comprises varying the characteristic of spatial periodicity as a function of position by thermal expansion and contraction of the optical medium.

32. A method as claimed in claim 31, wherein the Bragg reflector comprises an optical fibre defining the refractive index grating and wherein the controlling step regulates electrical current in an electrically conductive surface layer of the fibre to maintain the fibre at a controlled temperature.

33. A method as claimed in claim 26, wherein said delaying step comprises delaying the first and second components by transmission via first and second delay lines having respective first and second Bragg reflectors.

34. A method as claimed in claim 33, wherein said first and second Bragg reflectors are constituted by respective first and second optical fibres having respective intracore refractive index gratings.

35. A method as claimed in claim 34, wherein said first and second fibres are fused together in side by side relationship and wherein said controlling step operates an actuator to effect bending of the fused fibres such that respective periodicities of the index gratings are varied by different amounts.

36. A method as claimed in claim 33, wherein said first and second Bragg reflectors define respective spatial periodicities of refractive index gratings which vary with position according to respective chirp characteristics which at least partially compensate for chromatic dispersion in the first and second components respectively.

37. A method as claimed in claim 27, wherein the optical medium is constituted by a polarisation maintaining optical fibre having an intracore refractive index grating, the delaying step comprising directing the first and second components into the polarisation maintaining fibre so as to propagate in orthogonal first and second modes.

38. A method as claimed in claim 37, wherein said strain producing step comprises operating an actuator to effect bending of the fibre in a direction which varies the amount of biref ringence between the first and second modes.

39. A method as claimed in claim 25, wherein the separating step separates the first and second components so as to correspond substantially to principal polarisation states of the optical signal with respect to the optical waveguide in which said polarisation mode dispersion occurs.

40. A method as claimed in claim 39, wherein the separating step comprises operating a polarisation controller receiving the optical signal, and splitting the optical signal in a polarisation beam splitter receiving the output of the polarisation controller and outputting the first and second components.

41. A method as claimed in claim 40 comprising measuring the dispersion delay between the first and second components, and controlling the polarisation controller in response to the measurement of dispersion delay such that the dispersion delay measurement is maximised.

42. A method as claimed in claim 41, wherein the first and second components output from the polarisation beam splitter are input to respective directional couplers directing the respective components into first and second delay lines, the directional couplers further directing the delayed components to the recombining means.

43. A method as claimed in claim 41, wherein the input signal is directed to the polarisation controller via a directional coupler and wherein the first and second components output from the polarisation beam splitter are input to said respective delay lines, the delayed first and second components being returned via the polarisation beam splitter and polarisation controller to the directional coupler which further directs the delayed components to an output waveguide, whereby said recombining step is effected by said polarisation beam splitter.

44. A method as claimed in claim 40 comprising measuring the output signal from the recombining step to provide a feedback signal representative of the effect of polarization mode dispersion in the output signal, and controlling the polarization controller and the delay increment provided in said delaying step so as to minimise the measured effect of polarizatin mode dispersion.

45. A method as claimed in claim 44 wherein said measuring step comprises operating a receiver to provide an electrical output representative of the output signal from the recombining step and measuring the electrical output to provide said feedback signal.

46. A method as claimed in claim 26, wherein the spatial periodicity is a linear function of longitudinal position relative to the optical medium.

47. A method as claimed in claim 26, wherein the refractive index grating comprises a chirped periodic modulation of refractive index as a function of position along the optical medium and wherein the modulation has an amplitude envelope which is modulated with respect to position such that the grating constitutes a sampled grating, whereby reflection at a common reflection position occurs for a plurality of wavelength components of the optical signal.

48. A method as claimed in claim 25 wherein the parameter controlled by the controlling step is constituted by the values of one or more wavelengths of the optical signal, said controlling step varying the values of one or more wavelengths of the optical signal transmitted via a waveguide in which the polarisation mode dispersion occurs.

49. Delay apparatus for compensating for an unwanted delay between first and second components of an optical signal, the apparatus comprising;
  first and second delay lines operable to delay the first and second components by respective delays differing by a delay increment;
  recombining means operable to recombine the delayed first and second components to form an optical output signal; and
  control means operable to control the delay increment such that in the output signal the dispersion delay is substantially compensated by the delay increment;
  wherein at least one delay line comprises a chirped Bragg reflector extending longitudinally of the delay line, wherein said respective delay results from a time taken for said respective component to traverse the delay line to and from a reflection position at which Bragg reflection occurs, and wherein the control means is operable to variably regulate a characteristic of spatial periodicity as a function of position of a chirped refractive index grating formed in an optical medium of the Bragg reflector to thereby variably define the reflection position relative to the Bragg reflector.

50. Delay apparatus as claimed in claim 49 wherein each of the first and second delay lines comprises a respective chirped Bragg reflector and wherein the control means is operable to regulate the characteristic of spatial periodicity of only one of said delay lines.

51. Delay apparatus as claimed in claim 50 wherein said Bragg reflectors comprise respective sampled refractive index gratings.

* * * * *